(12) United States Patent
Lin et al.

(10) Patent No.: US 10,001,987 B2
(45) Date of Patent: Jun. 19, 2018

(54) METHOD FOR UPDATING A FIRMWARE FILE OF AN INPUT/OUTPUT MODULE

(71) Applicant: MITAC COMPUTING TECHNOLOGY CORPORATION, Taoyuan (TW)

(72) Inventors: Yi-Lan Lin, Taoyuan (TW); Jen-Chih Lee, Taoyuan (TW); Kwang-Chao Chen, Taoyuan (TW); Hung-Tar Lin, Taoyuan (TW); Li-Tien Chang, Taoyuan (TW); Heng-Chia Hsu, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days. days.

(21) Appl. No.: 15/496,170

(22) Filed: Apr. 25, 2017

(65) Prior Publication Data

US 2017/0357497 A1    Dec. 14, 2017

(30) Foreign Application Priority Data

Jun. 8, 2016    (TW) .............................. 105118077 A

(51) Int. Cl.
*G06F 9/44* (2018.01)
*G06F 9/445* (2018.01)

(52) U.S. Cl.
CPC ...................... *G06F 8/65* (2013.01)

(58) Field of Classification Search
CPC ....................................................... G06F 8/65
USPC ......................................................... 717/173
See application file for complete search history.

(56) References Cited

U.S. PATENT DOCUMENTS

| | | | | |
|---|---|---|---|---|
| 6,639,939 B1 * | 10/2003 | Naden | ................... | H04B 1/707 375/140 |
| 8,904,374 B2 * | 12/2014 | Nakamura | ............... | G06F 8/66 717/168 |
| 9,172,640 B2 * | 10/2015 | Vincent | ............... | H04L 12/4633 |
| 9,726,515 B2 * | 8/2017 | Donaghey | ............... | G06F 8/654 |
| 2006/0126510 A1 * | 6/2006 | Russell | ................ | H04L 1/0083 370/235 |
| 2007/0055969 A1 * | 3/2007 | Yang | ........................ | G06F 8/65 717/168 |

(Continued)

OTHER PUBLICATIONS

Rizzo, "netmap: a novel framework for fast packet I/O", University di Pisa, 2012.*

(Continued)

*Primary Examiner* — Wei Zhen
*Assistant Examiner* — Junchun Wu
(74) *Attorney, Agent, or Firm* — Brinks Gilson & Lione

(57) ABSTRACT

A method is for updating an original firmware file of an I/O module which communicates with multiple host-end devices and stores the original firmware file. The method includes: receiving a current-received data packet from one host-end device; when it is determined that the current-received data packet is a first data packet constituting an update file, and that the original firmware file is not undergoing an update process, setting a status flag to indicate that the original firmware file is undergoing an update process, storing the current-received data packet; and repeating the previous steps when it is determined that the current-received data packet is not a last one data packet constituting the update file.

12 Claims, 3 Drawing Sheets

(56) References Cited

U.S. PATENT DOCUMENTS

| | | | | |
|---|---|---|---|---|
| 2008/0112416 | A1* | 5/2008 | Hsieh | G06F 8/65 370/395.52 |
| 2009/0094450 | A1* | 4/2009 | Krzyzanowski | G06F 8/65 713/100 |
| 2013/0086574 | A1* | 4/2013 | Yada | G06F 9/44 717/173 |
| 2013/0290947 | A1* | 10/2013 | Li | G06F 8/65 717/171 |
| 2016/0380739 | A1* | 12/2016 | Athalye | H04L 5/0055 370/328 |
| 2017/0311054 | A1* | 10/2017 | Donaghey | H04Q 9/00 |

OTHER PUBLICATIONS

Jungck et al. Chapter 19 "Descriptor Type and Operations", CloudShield Technologies, Inc. 2011.*

Michell et al., "State Based Key Hop Protocol: A Lightweight Security Protocol for Wireless Networks", ACM, 2004.*

Hummen et al., "6LoWPAN Fragmentation Attacks and Mitigation Mechanisms", ACM, 2013.*

\* cited by examiner

METHOD FOR UPDATING A FIRMWARE FILE OF AN INPUT/OUTPUT MODULE

CROSS-REFERENCE TO RELATED APPLICATION

This application claims priority of Taiwanese Patent Application No. 105118077, filed on Jun. 8, 2016.

FIELD

The disclosure relates to a method for updating a firmware file of an input/output module.

BACKGROUND

Conventionally, an input/output (I/O) module included in a server is coupled to one or more host-end devices via a host bus adapter (HBA). When multiple host-end devices are all coupled to the I/O module, each of the host-end devices is capable of transmitting data to the I/O module. For example, when it is desired to update a firmware file of the I/O module, each of the host-end devices may transmit an update file to the I/O module for allowing the I/O module to perform a firmware update process.

In the firmware update process, an undesirable scenario may occur when a plurality of the host-end devices simultaneously attempt to transmit data packets including parts of different update files to the I/O module. For example, a first host-end device (A) may attempt to transmit data packets that constitute a first update file, and a second host-end device (B) may attempt to transmit data packets that constitute a second update file.

In such a scenario, the I/O module attempts to store all the received data packets from both the first host-end device (A) and the second host-end device (B) into a storage device included in the I/O module, and frequent access to the storage device may incur physical damages thereto. Additionally, the capacity of the storage device may be insufficient for storing various update files from respective host-end devices (e.g., in the above example, space for two complete update files would be required). Another undesirable scenario is that in storing the data packets from different host-end devices, part of a particular update file that is stored may be inadvertently overwritten by a newly received data packet, possibly causing the update file to become incorrectly stored.

SUMMARY

Therefore, an object of the disclosure is to provide a method that can alleviate at least one of the drawbacks of the prior art.

According to one embodiment of the disclosure, the method is for updating an original firmware file of an input/output (I/O) module. The I/O module communicates with a plurality of host-end devices and includes a processor and a storage device. The storage device stores the original firmware file and update status data associated with the original firmware file. The update status data includes an accumulated offset value and a status flag. The method includes the steps of:

a) receiving a current-received data packet from one of the host-end devices, the current-received data packet having a length value and a fragment offset value;

b) determining, by the processor, whether the current-received data packet is a first one of data packets constituting an update file;

c) when it is determined that the current-received data packet is the first one of the data packets constituting the update file, determining, by the processor, whether the status flag indicates that the original firmware file is undergoing an update process;

d) when it is determined that status flag indicates that the original firmware file is not undergoing an update process,
setting, by the processor, the status flag to indicate that the original firmware file is undergoing an update process,
storing the current-received data packet in the storage device, and
updating, by the processor, the accumulated offset value based on the length value and the fragment offset value of the current-received data packet;

e) when the determination in step b) is negative, determining, by the processor, whether the current-received data packet is received in a correct order;

f) when the determination in step e) is affirmative, storing the current-received data packet in the storage device, and updating, by the processor, the accumulated offset value based on the length value and the fragment offset value of the current-received data packet;

g) determining, by the processor, whether the current-received data packet is a last one of the data packets constituting the update file; and h) when it is determined that the current-received data packet is not the last one of the data packets constituting the update file, repeating steps a) to g) for receiving another data packet from the one of the host-end devices as the current-received data packet.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
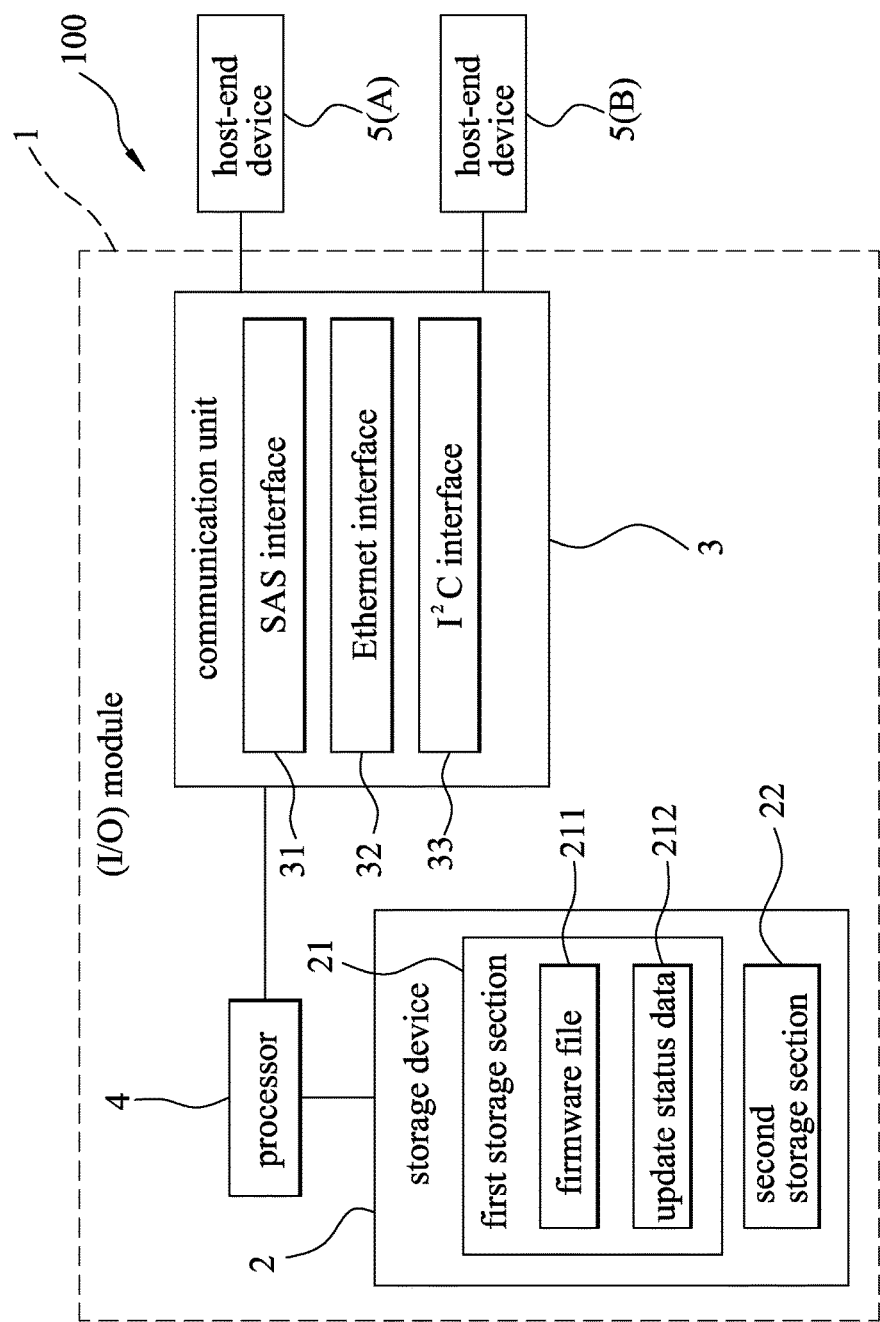
FIG. 1 is a block diagram illustrating a system according to one embodiment the disclosure.

FIG. 1 illustrates a system 100 according to one embodiment of the disclosure. The system 100 includes an input/output (I/O) module 1 and a plurality of host-end devices 5 communicating with the I/O module 1.

In this embodiment, the I/O module 1 is included in a server or a rack server, and may include a storage device 2, a communication unit 3, and a processor 4 coupled to the storage device 2 and the communication unit 3. For example, the processor 4 may be embodied using an expander.

The storage device 2 may be embodied using a physical memory device, and includes a first storage section 21 and a second storage section 22. The first storage section 21 stores a firmware file 211, and update status data 212 that is associated with the firmware file 211. The update status data 212 may include an accumulated offset value, a latest receipt time and a status flag. The accumulated offset value is initially set at an initial offset value before any data packet is received. Details regarding the update status data 212 will be addressed later on.

The communication unit 3 may be embodied using, for example, a host bus adapter (HBA), and includes a serial attached small computer system interface (SAS) interface 31, an Ethernet interface 32 and an inter-integrated circuit ($I^2C$) interface 33. In this embodiment, the SAS interface 31 is used for communicating with the host-end devices 5, while the Ethernet interface 32 and the $I^2C$ interface 33 may be employed for communicating with other host-end devices in other embodiments.

Any one of the host-end devices 5 in communication with the I/O module 1 may be employed for updating the firmware file 211 stored in the first storage section 21 (e.g., replacing the firmware file 211 with an update file).

In practice, the host-end devices 5 transmit data to the I/O module 1 in the form of data packets. Namely, when one of the host-end devices 5 transmit an update file to the I/O module 1, the update file may be split into a number of data packets (that is to say, the data packets constitute the update file) and then transmitted one by one to the I/O module 1.

In order to ensure that the entire update file is transmitted correctly, each of the data packets is configured to carry a length value associated with a size of the data packet, and a fragment offset value associated with a sequence of the data packets. For example, for an update file that is fragmented into a number N of data packets in a sequence, the fragment offset value carried by each of the data packets indicates the data packet as a first one, a second one, . . . , or an $N^{th}$ one in the sequence.

In addition, a first one of the data packets in the sequence further includes a total size value associated with the size of the update file. With the above information, the processor 4 is capable of determining whether all data packets constituting the update file (i.e., all data packets in the sequence) are received, in order to perform an update process for the firmware file 211.

Figure 2:
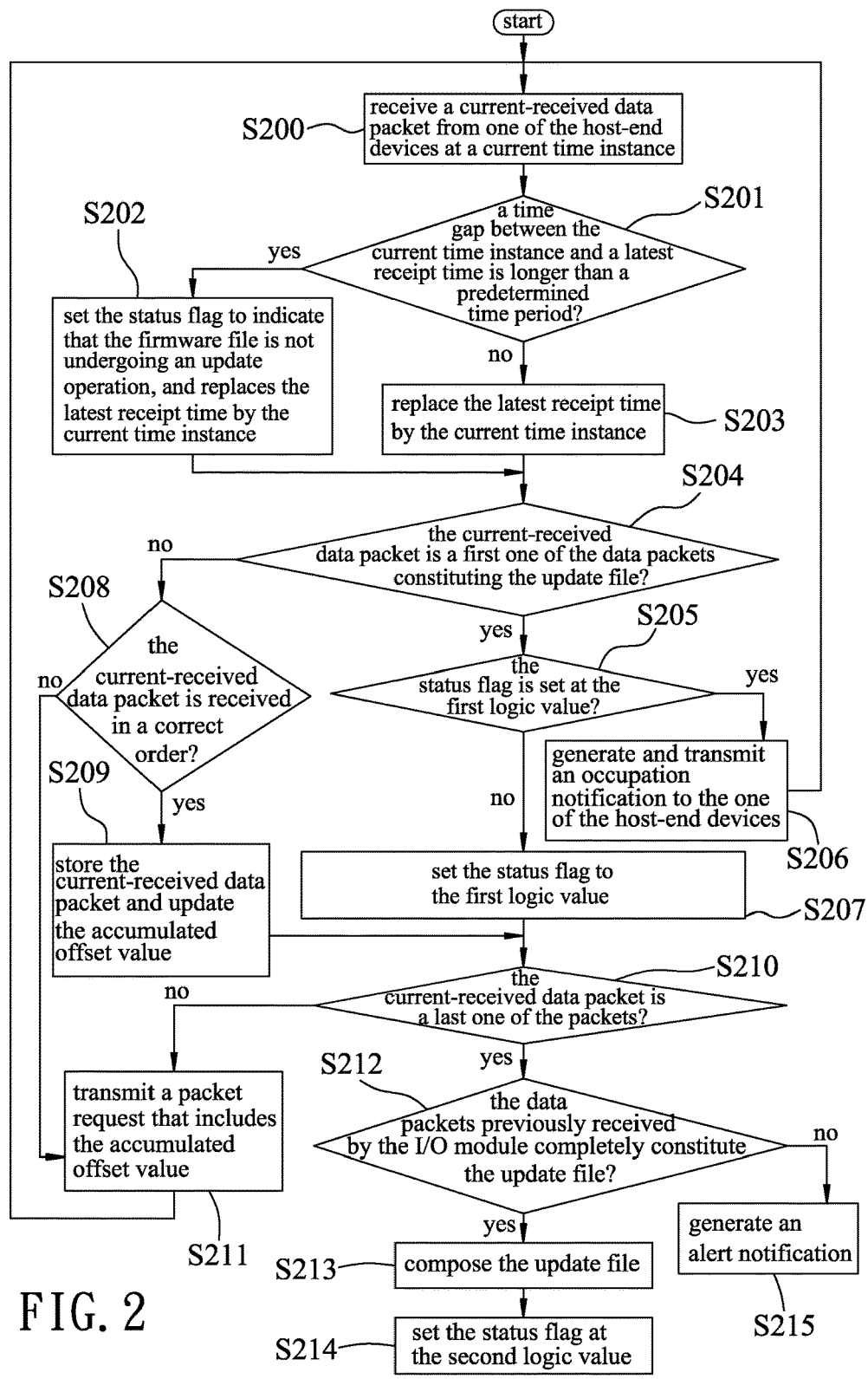
FIG. 2 is a flow chart illustrating steps of a method for updating a firmware file of an input/output (I/O) module of the system, according to one embodiment the disclosure.

FIG. 2 is a flow chart illustrating steps of a method for updating the firmware file 211 of the I/O module 1, according to one embodiment of the disclosure. In this embodiment, the steps of the method are implemented by the processor 4.

In step S200, the processor 4 receives a current-received data packet from one of the host-end devices 5 at a current time instance. The current-received data packet includes the length value and the fragment offset value.

In response to the receipt of the current-received data packet, the processor 4 determines, in step S201, whether a time gap between the current time instance and a latest receipt time is longer than a predetermined time period. In this embodiment, the latest receipt time indicates a time instance at which a latest-received data packet is received by the I/O module right before the current-received data packet.

When it is determined that the time gap is longer than the predetermined time period, the flow proceeds to step S202, in which the processor 4 sets the status flag to indicate that the firmware file 211 is not undergoing an update process and replaces the latest receipt time by the current time instance.

For example, the status flag may designate a first logic value '1' and a second logic value '0'. The second logic value '0' may be employed to indicate that the firmware file 211 is not undergoing an update process. On the other hand, the first logic value '1' may be employed to indicate that the firmware file 211 is currently undergoing an update process.

When it is determined that the time gap is not longer than the predetermined time period, the flow proceeds to step S203, in which the processor 4 replaces the latest receipt time by the current time instance.

Step S201 may be implemented in the following manner. Firstly, the processor 4 determines the current time instance, at which the current-received data packet is received. This may be done using a timer (not depicted in the drawings). In one example, the current time instance is 08:06:32, and the predetermined time period is one minute.

Next, the processor 4 calculates the time gap. In this example, the latest receipt time is 08:06:01, resulting in a time gap of 31 seconds, which is not longer than the predetermined time period of one minute. As such, the flow proceeds to step S203 following step S201, and the latest receipt time is updated as 08:06:32.

In step S204, the processor 4 determines whether the current-received data packet is a first one of the data packets constituting the update file.

Specifically, the processor 4 compares the fragment offset value of the current-received data packet with the initial offset value which is 0 in this embodiment. Since the fragment offset value of the first one of the data packets would be set at 0 in some embodiments, the processor 4 determines that the data packet is the first one of the packets when the fragment offset value is identical with the initial offset value.

When it is determined that the current-received data packet is the first one of the data packets constituting the update file, the flow proceeds to step S205. Otherwise, the flow proceeds to step S208.

In step S205, the processor 4 determines whether the status flag is set at the first logic value '1' indicating that the firmware file 211 is undergoing an update process. When it is determined that the firmware file 211 is undergoing an update process, the flow proceeds to step S206. Otherwise, the flow proceeds to step S207.

In step S206, the processor 4 generates and transmits an occupation notification to the one of the host-end devices 5 indicating that the firmware file 211 is undergoing an update process, and discards the current-received data packet. In response to the occupation notification, the one of the host-end devices 5 stops transmitting any data packet to the I/O module 1 for a predetermined wait period (e.g., 10 seconds).

For example, while the firmware file 211 is undergoing an update process with an update file received from the host-end device 5A, when the host-end device 5B transmits a first data packet of another update file to the I/O module 1 in step S200, the processor 4 will discard the first data packet from the host-end device 5B without storing the same in the storage device 2. Then, the processor 4 transmits the occupation notification to the host-end device 5B so as to notify the host-end device 5B to temporarily stop transmitting data packets to the I/O module 1.

When the processor 4 determines, in step S205, that the status flag is set at the second logic value '0', the flow proceeds to step S207, in which the processor 4 sets the status flag to the first logic value '1' to indicate that the firmware file 211 is undergoing an update process (i.e., setting the status flag to the first logic value '1'). Furthermore, the processor 4 stores the current-received data packet in the second storage section of the storage device 2, and updates the accumulated offset value based on the length value and the fragment offset value of the current-received data packet.

In this embodiment, the accumulated offset value is updated to a summation of the length value and the fragment offset value of the current-received data packet (i.e., the first one of the data packets constituting the update file). In some embodiments, the accumulated offset value may be updated by adding the length value thereto.

In step S208, the processor 4 determines whether the current-received data packet, which is not the first one of the data packets constituting the update file, is received in a correct order. Specifically, the processor 4 compares the fragment offset value of the current-received data packet with the accumulated offset value, and determines that the current-received data packet is received in a correct order when the fragment offset value is identical with the accumulated offset value.

When the determination in step S208 is affirmative, the flow proceeds to step S209. Otherwise, the flow proceeds to step S211.

In step S209, the processor 4 stores the current-received data packet in the second storage section of the storage device 2, and updates the accumulated offset value based on the length value and the fragment offset value of the current-received data packet. The updating of the accumulated offset value is similar to that as described in step S207.

In step S210, the processor 4 determines whether the current-received data packet is a last one of the packets constituting the update file. In this embodiment, the determination is based on the initial offset value, the accumulated offset value that has been updated in step S207/S209, and the total size value of the update file that is included in the first one of the data packets constituting the update file.

Specifically, the processor 4 calculates a summation of the initial offset value and the total size value, compares the summation with the accumulated offset value, and determines that the current-received data packet is the last one of the data packets constituting the update file when the summation is identical with the accumulated offset value.

When the determination made in step S210 is affirmative, the flow proceeds to step S212. Otherwise, the flow proceeds to step S211.

In step S211, the processor 4 transmits a packet request that includes the accumulated offset value to the one of the host-end devices 5 that transmitted the current-received data packet to the I/O module 1 in step S200. That is to say, the processor 4 requests from the one of the host-end devices 5 a data packet having a fragment offset value identical with the accumulated offset value.

Afterward, the flow goes back to step S200, in which the one of the host-end devices 5 is caused to transmit a specific packet to the I/O module 1 in response to receipt of the packet request. The specific packet has a fragment offset value identical with the accumulated offset value.

In one example, after the first one of the data packets is received and stored, the accumulated offset value is updated by the processor 4 such that when the second one of the data packets is received, the fragment offset value carried thereby is identical to the accumulated offset value. As such, in cases where the current-received data packet received in step S200 is neither the first one nor the second one of the data packets or the current-received data packet is corrupted, the determinations made in step S204 and S208 are both negative, and the flow proceeds to step S211 to transmit the packet request, instructing the one of the host-end devices 5 to transmit the second one of the data packets to the I/O module 1.

Before it is determined in step S210 that the current-received data packet is the last one of data packets constituting the update file, the flow goes back to step S200 to repeat the above-mentioned steps. Specifically, the I/O module 1 receives another data packet in step S200, which serves as the current-received data packet in the repeated execution of steps S200-S211, from the one of the host-end devices 5.

On the other hand, when it is determined by the processor 4 that the data packet is the last one of the data packets constituting the update file, in step S212, the processor 4 determines whether the data packets previously received by the I/O module 1 completely constitute the update file.

Figure 3:
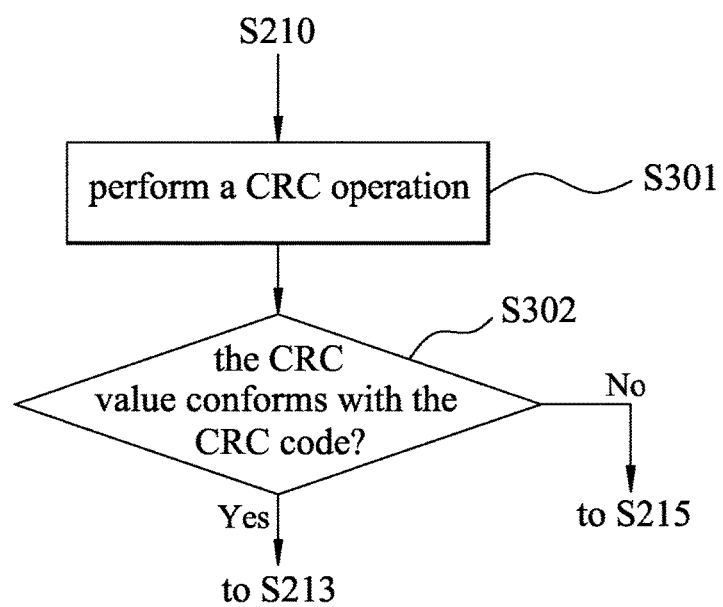
FIG. 3 is a flow chart illustrating sub-steps for determining whether a number of data packets received by the I/O module completely constitute an update file for updating the firmware file of the I/O module, according to one embodiment the disclosure.

In this embodiment, the first one of the data packets constituting the update file includes a cyclic redundancy check (CRC) code, and the determination of step S212 includes the following sub-steps, as illustrated in FIG. 3.

In sub-step S301, the processor 4 performs a CRC operation (e.g., CRC-32) on all the data packets received in the various instances of step S200, so as to obtain a CRC value.

In sub-step S302, the processor 4 determines whether the CRC value obtained in sub-step S301 conforms with the CRC code.

When it is determined that the CRC value conforms with the CRC code, the processor 4 deems that the data packets received by the I/O module 1 completely constitute the update file, and the flow proceeds to step S213. Otherwise, the flow proceeds to step S215.

In step S213, the processor 4 composes the update file using the data packets stored in the second storage section 22, and updates the firmware file 211 with the update file by, for example, replacing the firmware file 211 with the update file. Then, after step S213, the processor 4 sets, in step S214, the status flag at the second logic value '0' to indicate that the firmware file 211 is not undergoing an update process.

In step S215, the processor 4 generates an alert notification indicating that the update of the firmware file 211 is unsuccessful, and transmits the alert notification to the one of the host-end devices 5, e.g., the host-end device 5 which transmits the very first data packet constituting the update file. In one embodiment, the processor 4 may be programmed to further clear all data packet(s) stored in the second storage section 22.

In one embodiment, after the firmware file 211 is updated, the processor 4 may perform a reboot operation for the server device that includes the I/O module 1, and transmit a success notification to the one of the host-end devices 5 after the reboot operation, notifying the one of the host-end devices 5 that the update of the firmware file 211 is successful.

In one embodiment, the designation of the first storage section 21 and the second storage section 22 may be changed after the reboot operation.

For example, before the method is implemented, the first storage section 21 may include memory blocks having addresses 0000-0002 (for storing the update status data 212) and 0003-FF00 (for storing the firmware file 211), and the second storage section 22 may include memory blocks having addresses F001-FFFF (for storing the data packets received in step S200).

After the method is implemented and the reboot operation is completed, the first storage section 21 is changed to include the memory blocks having addresses 0000-0002 and F001-FFFF, the latter storing the update file that serves as the firmware file 211. Additionally, the memory blocks having addresses 0003-FF00 may be cleared and set as the second storage section 22 for subsequently storing a new update file when the method is implemented again.

In one embodiment, the predetermined time period is set to be longer than the time required for the entire method to be implemented. That is to say, when the processor 4 determines that the time gap has become longer than the predetermined time period, it may be assumed that a prior update process has initiated, but did not properly finish. As a result, the processor 4 may cancel the prior update process, and subsequently allow another one of the host-end devices 5 to initiate a new update process.

To sum up, embodiments of the disclosure provide a method for updating the firmware file 211 that can be implemented with more efficiency by designating the status flag to indicate whether the firmware file 211 is undergoing an update process. As such, when it is determined that the firmware file 211 is undergoing an update process from a specific one of the host-end devices 5 that is in communication with the I/O module 1, data packets transmitted from other host-end devices 5 will be discarded instead of being stored in the storage device 2. With such a configuration, a number of times of access to the storage device 2 may be reduced, thereby potentially increasing the lifespan of the storage device 2. Furthermore, storage space of the storage device 2 allocated to store the data packets may be reduced as well. Additionally, the scenario that part of a particular update file becomes inadvertently overwritten by a newly received data packet may be prevented.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for updating a firmware file of an input/output (I/O) module that communicates with a plurality of host-end devices and that includes a processor and a storage device, the storage device storing the firmware file (211) and update status data (212) associated with the firmware file (211), the update status data (212) including an accumulated offset value and a status flag, the method comprising steps of:
    a) receiving a current-received data packet from one of the host-end devices, the current-received data packet having a length value and a fragment offset value;
    b) determining, by the processor, whether the current-received data packet is a first one of data packets constituting an update file;
    c) when it is determined that the current-received data packet is the first one of the data packets constituting the update file, determining, by the processor, whether the status flag indicates that the firmware file (211) is undergoing an update process;
    d) when it is determined that the status flag indicates that the firmware file (211) is not undergoing an update process,
        setting, by the processor, the status flag to indicate that the firmware file (211) is undergoing an update process,
        storing the current-received data packet in the storage device, and
        updating, by the processor, the accumulated offset value based on the length value and the fragment offset value of the current-received data packet;
    e) when it is determined in step b) that the current-received data packet is not the first one of data packets constituting the update file, determining, by the processor, whether the current-received data packet is received in a correct order;
    f) when it is determined in step e) that the current-received data packet is received in the correct order, storing the current-received data packet in the storage device, and updating, by the processor, the accumulated offset value based on the length value and the fragment offset value of the current-received data packet;
    g) determining, by the processor, whether the current-received data packet is a last one of the data packets constituting the update file; and
    h) when it is determined that the current-received data packet is not the last one of the data packets constituting the update file, repeating steps a) to g) for receiving another data packet from the one of the host-end devices as the current-received data packet.

2. The method of claim 1, the update status data further including a latest receipt time at which a latest-received data packet is received by the I/O module right before the current-received data packet, the method further comprising, after step a), steps of:
    determining a current time instance at which the current-received data packet is received;
    replacing the latest receipt time by the current time instance;
    determining whether a time gap between the current time instance and the latest receipt time is longer than a predetermined time period; and
    when it is determined that the time gap is longer than the predetermined time period, setting the status flag to indicate that the firmware file (211) is not undergoing an update process.

3. The method of claim 1, wherein, when it is determined by the processor that the current-received data packet is the last one of the data packets constituting the update file in step g), the processor is programmed to perform the steps of:
    determining whether the data packets stored in the storage device completely constitute the update file;
    when it is determined that the data packets stored in the storage device completely constitute the update file, by the processor, updating the firmware file with the update file and setting the status flag to indicate that the firmware file (211) is not undergoing an update process; and
    when it is determined that the data packets stored in the storage device do not completely constitute the update file, generating an alert notification indicating that the update of the firmware file (211) is unsuccessful and transmitting the alert notification to the one of the host-end devices.

4. The method of claim 3, the first one of the data packets including a cyclic redundancy check (CRC) code, wherein the step of determining whether the data packets stored in the storage device completely constitute the update file includes:
- performing a CRC operation on the data packers received, so as to obtain a CRC value;
- determining whether the CRC value conforms with the CRC code; and
- determining that the data packets stored in the storage device completely constitute the update file when the CRC value conforms with the CRC code.

5. The method of claim 1, further comprising a step of:
- when it is determined in step c) that the status flag indicates that the firmware file (211) is undergoing an update process, transmitting an occupation notification to the one of the host-end devices indicating that the firmware file (211) is undergoing an update process, and discarding the current-received data packet.

6. The method of claim 1, wherein in step e), the processor compares the fragment offset value of the current-received data packet with the accumulated offset value, and determines that the current-received data packet is received in a correct order when the fragment offset value is identical with the accumulated offset value.

7. The method of claim 6, further comprising a step of:
- when it is determined in step e) that the current-received data packet is not received in the correct order, transmitting a packet request that includes the accumulated offset value to the one of the host-end devices to cause the one of the host-end devices to transmit a specific packet to the I/O module, the specific packet having a fragment offset value identical with the accumulated offset value.

8. The method of claim 1, further comprising a step of:
- when it is determined in step g) that the current-received data packet is not the last one of the data packets constituting the update file, transmitting a packet request that includes the accumulated offset value to the one of the host-end devices to cause the one of the host-end devices to transmit a specific packet to the I/O module, the specific packet having a fragment offset value identical with the accumulated offset value.

9. The method of claim 1, the accumulated offset value initially being set at an initial offset value, wherein in step b), the processor compares the fragment offset value of the current-received data packet with the initial offset value, and determines that the current-received data packet is the first one of the data packets constituting the update file when the fragment offset value is identical with the initial offset value.

10. The method of claim 1, the accumulated offset value originally being set at an initial offset value, wherein the determination made in step g) is based on the initial offset value, the accumulated offset value that has been updated, and a total size value of the update file that is included in the first one of the data packets constituting the update file.

11. The method of claim 10, wherein in step g), the processor calculates a summation of the initial offset value and the total size value, compares the summation with the accumulated offset value, and determines that the current-received data packet is the last one of the data packets constituting the update file when the summation is identical with the accumulated offset value.

12. The method of claim 2, wherein the predetermined time period is set to be longer than the time required for the entire method to be implemented.

\* \* \* \* \*